United States Patent
Lennen

(10) Patent No.: US 8,238,410 B2
(45) Date of Patent: Aug. 7, 2012

(54) METHOD AND APPARATUS FOR MITIGATING THE EFFECTS OF NARROWBAND INTERFERING SIGNALS IN A GPS RECEIVER

(75) Inventor: Gary Lennen, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 756 days.

(21) Appl. No.: 12/341,536

(22) Filed: Dec. 22, 2008

(65) Prior Publication Data

US 2009/0323779 A1 Dec. 31, 2009

Related U.S. Application Data

(60) Provisional application No. 61/076,601, filed on Jun. 27, 2008.

(51) Int. Cl.
*H04B 1/00* (2006.01)

(52) U.S. Cl. ........ 375/148; 375/144; 375/146; 375/346; 375/348; 375/350; 375/351; 455/63.1; 455/278.1; 455/296; 455/303; 455/306; 455/307

(58) Field of Classification Search .................. 375/144, 375/146–148, 316, 346, 348, 350, 351; 455/63.1, 455/278.1, 227, 296, 303, 306, 307

See application file for complete search history.

(56) References Cited

U.S. PATENT DOCUMENTS

| | | | | |
|---|---|---|---|---|
| 6,047,171 | A * | 4/2000 | Khayrallah et al. | 455/266 |
| 6,122,309 | A * | 9/2000 | Bergstrom et al. | 375/130 |
| 6,760,674 | B2 * | 7/2004 | Bombard | 702/76 |
| 6,898,235 | B1 * | 5/2005 | Carlin et al. | 375/219 |
| 6,985,709 | B2 * | 1/2006 | Perets | 455/266 |
| 7,177,615 | B2 * | 2/2007 | Ono | 455/296 |
| 7,277,475 | B1 * | 10/2007 | Nguyen et al. | 375/148 |
| 2002/0012411 | A1 * | 1/2002 | Heinzl et al. | 375/350 |
| 2003/0174784 | A1 * | 9/2003 | Samarasooriya et al. | 375/308 |
| 2004/0014435 | A1 * | 1/2004 | Woo et al. | 455/103 |
| 2004/0062216 | A1 * | 4/2004 | Nicholls et al. | 370/320 |
| 2008/0225998 | A1 * | 9/2008 | Fu | 375/346 |

OTHER PUBLICATIONS

Rifkin et al. "Comparison of Narrowband Adaptive Filter Technologies for GPS", Mar. 2000, Mitre Technical Report.*
International Search Report dated Mar. 4, 2010.
Im et al., "Anti-Jamming Technique Performance Evaluation for GPS L1 C/A Software Receiver", ION GNSS 20th International Technical Meeting of the Satellite Division, Sep. 25-28, 2007, pp. 2787-2796.
Rifkin et al., "Comparison of Narrowband Adaptive Filter Technologies for GPS", IEEE, 2000, pp. 125-131.

* cited by examiner

*Primary Examiner* — Sam K Ahn
*Assistant Examiner* — Sophia Vlahos
(74) *Attorney, Agent, or Firm* — RatnerPrestia

(57) ABSTRACT

A positioning system receiver that mitigates narrowband interference by dynamically choosing the mitigation technique that yields the best interference mitigation capability with the least signal degradation to maximize receiver performance parameters such as receiver sensitivity, multipath resolution, and low power.

21 Claims, 6 Drawing Sheets

METHOD AND APPARATUS FOR MITIGATING THE EFFECTS OF NARROWBAND INTERFERING SIGNALS IN A GPS RECEIVER

CROSS-REFERENCE TO RELATED APPLICATIONS

This application claims priority under 35 U.S.C §119(e) to U.S. Provisional Application Ser. No. 61/076,601, titled "Method and Apparatus for Mitigating the Effects of Narrowband Interfering Signals in a GPS Receiver," filed on Jun. 27, 2008, all of which is incorporated into this application by reference in its entirety.

BACKGROUND OF THE INVENTION

1. Field of Invention

This invention relates in general to satellite navigation systems and in particular to mitigating the effects of narrowband interference in Global Positioning System ("GPS") receivers.

2. Related Art

One major advantage of a spread spectrum system such as a satellite position system receiver (e.g., GPS receiver), is its ability to reject interference such as wide band interference. This ability is due to the correlation of a wide band interference signal with the reference code that reduces the power density of the interference and its effect on the resulting signal. However, this approach is also known to make the GPS receiver susceptible to narrow band interference. An example of this type of interference is commonly called continuous wave carrier (CW) interference. In fact, the narrower the bandwidth of the interference signal the less is the ability of the GPS or spread spectrum receiver to reject it. The failure to reject this narrowband interference results in degraded performance such as degraded receiver sensitivity.

Past methods of suppressing narrowband interference have included excision of interference in the frequency domain using OFFT (Overlapped Fast Fourier Transform) techniques or using ATF (adaptive transversal filter) techniques in the time domain. Use of frequency domain techniques results in faster response time, which approximately equals the FFT duration, but also degrades the GPS signal. This degradation even occurs when no interference is present in the received signal, thus lowering the receiver's sensitivity.

In contrast to frequency domain techniques, time domain techniques suffer from poorer interference suppression capability for higher power interference. This results because of severe distortion to the spread spectrum or GPS signal but it incurs no loss when no interference is present. The number, frequency and power of the narrowband interference may also dictate which technique to use for the optimal interference suppression performance under the operating environment. For example, the presence of a large number of interferences just outside the GPS signal band may require using just a filter in the time domain to reject the out of band interference so as to avoid the inherent degradation to the signal introduced by the finite duration of the FFT. On the other hand, the presence of a few powerful interferences inside the GPS signal band would require the use of the OFFT for its better interference suppression capability. The problem is further complicated by the time varying nature of the interference source, requiring GPS receivers to be able to quickly adapt its narrowband interference technique in response to the changing environment. In addition to using OFFT for interference suppression, past methods have also used OFFT to detect the presence of narrowband interference.

To improve GPS receiver sensitivity, relatively low power narrowband interference has to be detected and mitigated. Detecting low level narrowband interference using OFFT requires that the OFFT process runs longer and has more frequency bins. However, for fast interference mitigation response time in a dynamic environment, it is desirable to shorten the FFT duration. Therefore, the conflicting requirements when using OFFT for both detection and mitigation often result in less than optimal performance for both.

Therefore, there is a need for a system and method capable of mitigating the effects of narrowband interfering signals in a GPS Receiver.

SUMMARY

The present invention mitigates pre-correlation narrowband interference by enabling a GPS receiver to make mitigation decisions in response to changing operating conditions. It dynamically chooses the mitigation technique that yields the best interference mitigation capability with the least signal degradation to maximize receiver performance parameters such as receiver sensitivity, multipath resolution and low power. The present disclosure also describes a separate system and method for narrowband interference detection. Decoupling interference detection from mitigation allows for detection of low power narrowband interferer as well as fast mitigation response time with a smaller OFFT.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

The present disclosure describes a pre-correlation narrowband interference mitigation system and method that intelligently makes mitigation decisions in response to changing operating conditions. It dynamically chooses the mitigation technique that yields the best interference mitigation capability with the least signal degradation to maximize receiver performance parameters such as receiver sensitivity, multipath resolution, and low power. The disclosure also describes a separate system and method for narrowband interference detection. Decoupling interference detection from mitigation allows for both detection of low power narrowband interferer and fast mitigation response time with a smaller OFFT.

Described herein are methods and systems for detecting and mitigating narrowband interferences before performing signal correlation. The methods detect and monitor the number, power, frequency content of the detected interference signal relative to the GPS signal spectrum. A decision is then made to select the pre-correlation mitigation technique or combination thereof that gives the best interference mitigation performance.

Figure 1:
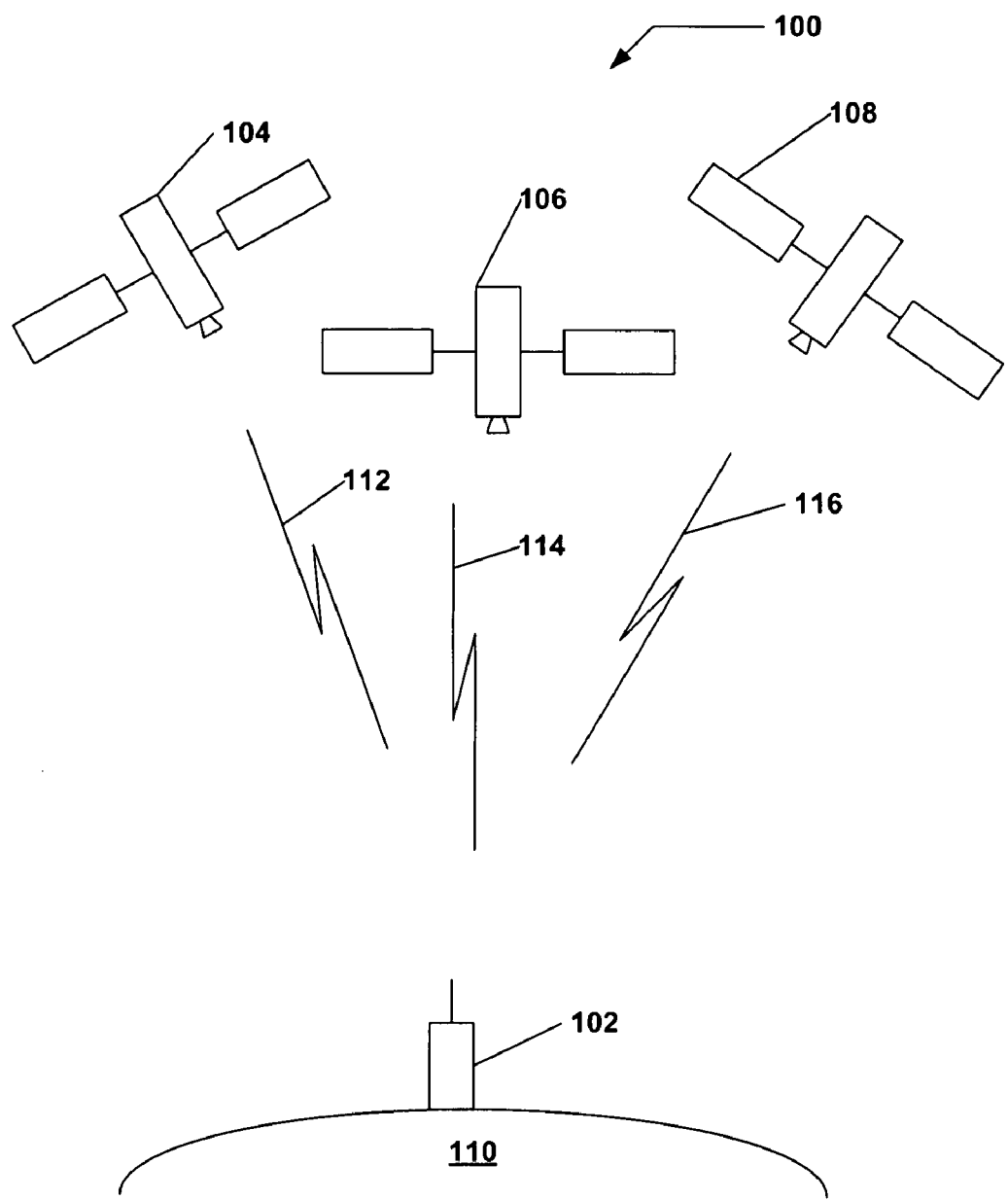
FIG. 1 is an illustration of a satellite positioning system with satellite vehicles (SVs) and an SV positioning system receiver that has an example implementation of the inventions.

FIG. 1 is an illustration of a satellite positioning system 100 with a satellite positioning system receiver 102 that has an example implementation of the inventions that mitigates the effects of narrowband interference and positioning system SVs 104, 106 and 108. The satellite positioning system receiver 102 may commonly be referred to as a Global Positioning System (GPS) receiver. But in practice the GPS receiver may be any type of position system receiver, including Galileo receiver and Global Orbiting Navigation Satellite System (GLONASS) receiver. The SVs 104, 106 and 108 transmit spread spectrum CDMA encoded positioning signals 112, 114 and 116 to the GPS receiver 102 located on or near the earth 110. Typically at least two spread spectrum CDMA encoded positioning signals plus accurate time or other spread spectrum CDMA encoded positioning signals may be used to determine the position of the GPS receiver 102 on the earth 110.

Figure 2:
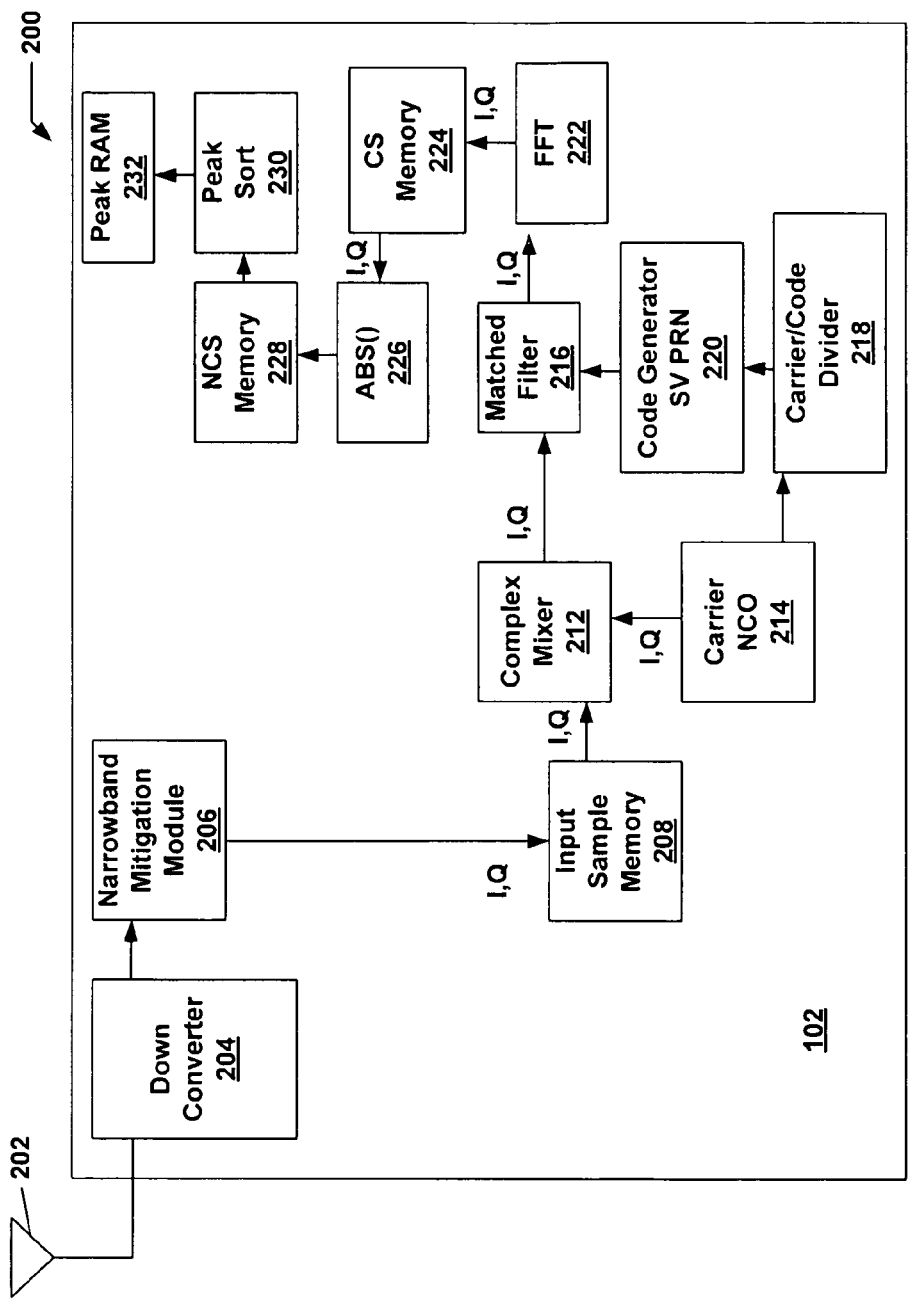
FIG. 2 is a block diagram of the example implementation of the SV positioning system receiver of FIG. 1.

FIG. 2 is a block diagram of an example implementation 200 of the satellite positioning system receiver (commonly referred to as a GPS receiver) 102 of FIG. 1. Positioning signals from the SVs 104, 106 and 108 may be received at the GPS receiver 102 via antenna 202. The positioning signals are down converted to an intermediate frequency (IF) by the down converter module 204. The IF samples are then processed by the narrowband mitigation module 206. The resulting I and Q signal data may be stored in an input sample memory 208. The digital samples may then be mixed by a complex mixer 210 with an I and Q signal from a carrier numerical controlled oscillator 212 to compensate for carrier offset and result in a baseband signal.

The resulting baseband signal samples may be processed by matched filter 216. The carrier NCO 214 may provide a carrier offset to a carrier/code divider 218 depending on the type of GPS signals being received (GPS, Galileo, etc. . . . ). The code generator 220, generates a pseudo-random number (PRN) associated with a spread spectrum CDMA signal from one of the SVs. The generated PRN is then used by the matched filter 216 to process the resulting signal samples. A fast Fourier transform (FFT) may then be applied by the FFT module 222 to the matched filtered digital signal samples The matched digital signal samples (I and Q) after having the FFT applied may be stored in the coherent sample (CS) memory 224. The resulting transformed digital signal samples from the CS memory 224 may then have an absolute value function 226 applied. The resulting values may then be stored in a non-coherent sample (NCS) memory 228. A peak sort 230 may then be applied with the peaks stored in peak memory or peak RAM 232. The peaks indicate where the strongest matches occurred between the PRN and digital signal samples that have had the strong SVs signals removed. Once a sufficient number of SVs are acquired and tacked, a position may be determined using the dated associated with the SVs.

Figure 3:
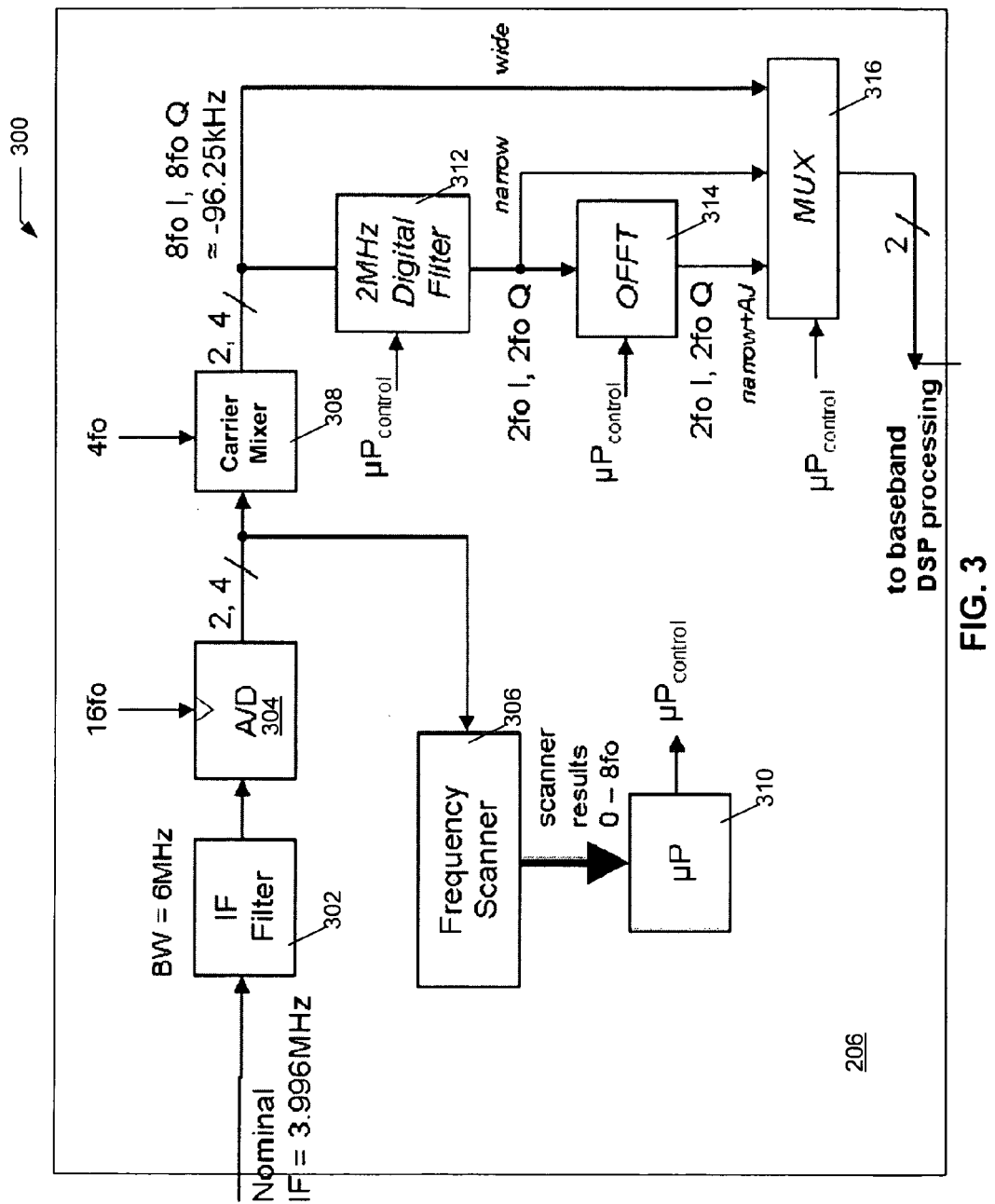
FIG. 3 is a block diagram of an example of an implementation of a pre-correlation interference mitigation system in the SV positioning system receiver of FIG. 2 in accordance with the invention.

FIG. 3 is a diagram 300 that depicts the narrowband mitigation module 206 as an example embodiment of the invention. A front-end analog IF filter 302 with a bandpass bandwidth of 6 MHz is centered around the IF signal containing both the GPS signal and any interference (including narrowband interference). An analog-to-digital (A/D) converter 304 digitizes the filtered IF signal for processing by a Frequency Scanner 306 and the Carrier Mixer 308. The Frequency Scanner 306 scans the A/D IF output for the presence of narrowband interference under the control of a controller or processor 310. The Carrier Mixer 308 down-converts the A/D IF output to baseband for processing by the mitigation blocks and for all subsequent baseband processing. The results from the Frequency Scanner 306 may also be read by the controller or processor 310 to select the appropriate pre-correlation interference mitigation technique via the MUX 316 to suppress the interference, if any technique is chosen at all.

Two example pre-correlation interference mitigation techniques are shown. One is the 2 MHz Digital Filter 312 that has as its main function the mitigation of interference outside of the 2 MHz GPS bandwidth under the control of the controller or processor 310. The other pre-correlation interference mitigation technique is an OFFT 314 that has as its main function the mitigation of interference inside the 2 MHz GPS bandwidth also under the control of the controller or processor 310. Alternatively, if there is no interference detected by the Frequency Scanner 306 no pre-correlation interference mitigation is performed and the output of the Carrier Mixer 308 is used directly for baseband processing.

Figure 4:
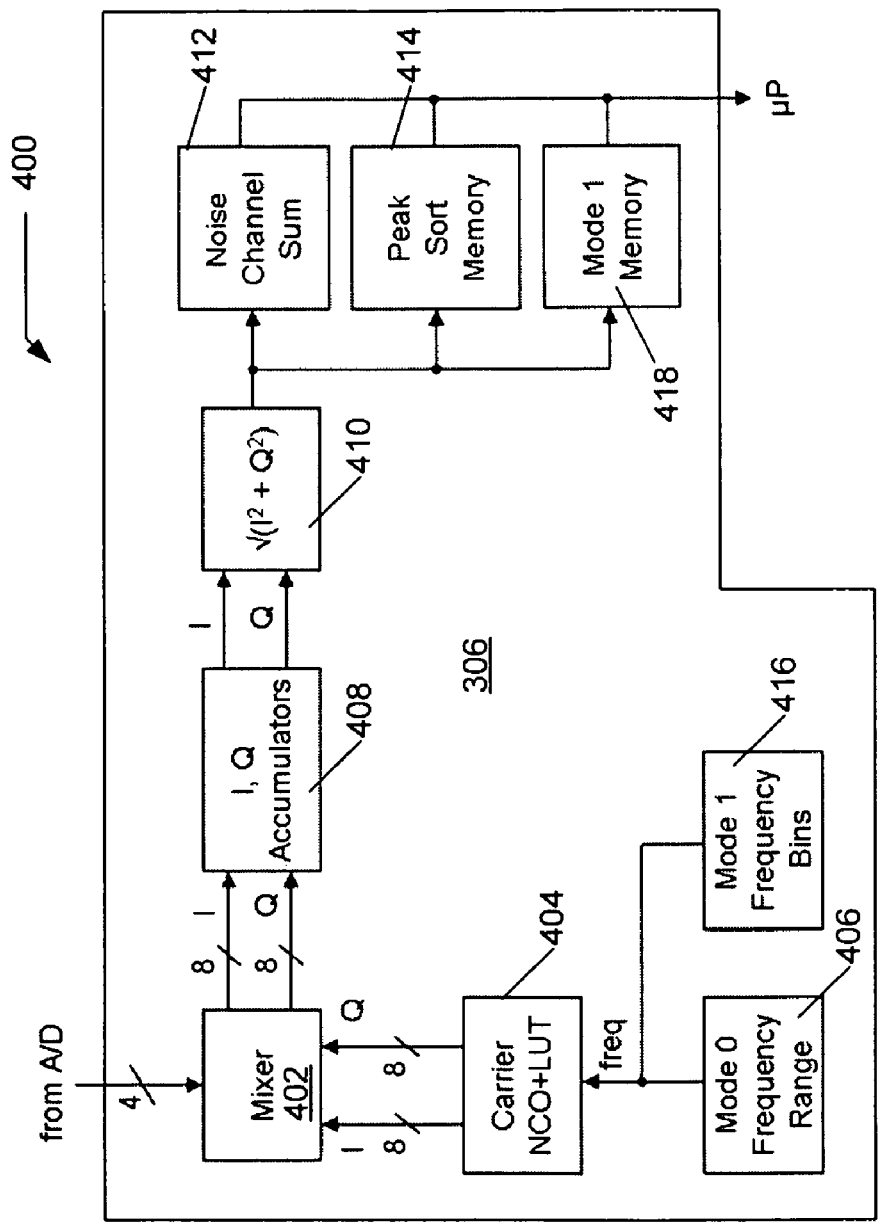
FIG. 4 is a block diagram of an example of an implementation of the frequency scanner shown with FIG. 3 and in accordance with the invention.

FIG. 4 is a block diagram 400 that illustrates an embodiment of the Frequency Scanner 306 such as that shown in FIG. 3 that provides the GPS receiver with real-time visibility into the presence of narrowband interference signals. Two main modes of operation are defined. Mode 0 is a scan mode intended to scan for unknown interferers (e.g., across the entire 8 MHz frequency range centered around the IF signal in the current implementation). The frequency bin width and the number of frequency bins to scan are controlled by the controller or processor 310 as a function of the desired sensitivity of interference detection and the frequency band to be searched. Mode 1 is a monitor mode intended to monitor a known interference at a particular frequency bin after mode 0 has detected its presence.

Mode 1 may monitors three frequency bins around an interferer in the current implementation; this allows the interferer to be tracked by moving the monitor frequency every 100 msecs such that the peak monitored power is the middle of the three frequencies. Such monitoring allows known interferers to be immediately tracked on receiver power up;

another aspect of monitoring is for the receiver to know when the interferer has ceased and can return to non-interference mitigation operation. This is the main reason the frequency scanner operates on the output of the A/D 304, so it is always able to see the interferer, independent of which mitigation method is being used.

As shown in FIG. 4, the A/D data are mixed to baseband via the Mixer 402 and Carrier NCO+LUT (Carrier Numerically Controlled Oscillator and Look Up Table) 404. In Mode 0, the frequency range 406 to be scanned is divided into frequency bins of a specified frequency resolution. Each frequency bin has a frequency parameter used by the Carrier NCO+LUT 404 to generate the quadrature sinusoidal. The quadrature sinusoidal is mixed against the received A/D data to generate the baseband signal. The baseband is accumulated by the I, Q Accumulators 408 for some number of samples as determined by the required interference detection sensitivity. At the end of the accumulation period the magnitude of the signal is calculated by the magnitude module 410. The magnitude for all the frequency bins is accumulated by the Noise Channel Sum 412 to compute the noise channel power. The noise channel power may be read by the controller or processor 310 at the end of the scan to generate an interference detection threshold. For example, a probability of a false detection of $10^{-5}$ may be obtained with a $CW_{threshold}=4.5$. Additionally, the magnitude is searched and sorted by the Peak Sort Memory 414 to find the top 8 frequency bins with the highest power. At the end of the scan, the frequency bin number and magnitude associated with the top 8 bins may then be read by the controller or processor 310. The magnitudes are compared against the interference detection threshold derived from the noise channel power to detect the presence of narrowband interference in any of the 8 bins. If narrowband interference is detected, the controller or processor 310 evaluates the distribution of the associated frequency bins 416 to determine which interference mitigation technique to use.

In mode 1, up to 8 detected narrowband interference may be monitored by programming the Carrier NCO+LUT 404 to generate the desired frequency, accumulating the baseband samples from the mixer 402, and storing the magnitude of the accumulated samples in the Mode 1 Memory 418. The control or processor 310 may then read the Mode 1 Memory 418 and compare the stored magnitude against the interference detection threshold to monitor the continued presence of the interference. If any of the interference signals disappears, the controller or processor 310 may evaluate the frequency distribution of the remaining interference signals and select a different mitigation technique.

The selection of different mitigation techniques may be based on the measured frequency and power of the interferer, and also additional intelligence regarding the state of the receiver. For example, if the GPS receiver is tracking four strong SVs and has a good position fix, then there is no need to mitigate a medium or small power interferer; alternatively, if the receiver has few than four SVs tracked, mitigating small/medium interferers may allow the receiver to successfully acquire/track low level GPS signals (e.g., <150 dBm). Alternatively, the controller or processor 310 may direct the scanner to initiate a Mode 0 scan to search for the presence of interference at other frequencies.

As mentioned, the controller or processor 310 may run an intelligent mitigation method using the detected interference from the Frequency Scanner 306 to determine the best mitigation technique to use or whether to use a mitigation technique. For example, if the detected interference is outside of the 2 MHz GPS bandwidth, the processor may only select the 2 MHz Digital Filter 312, FIG. 3, to mitigate the interference and bypass the OFFT 314. This is to avoid the inherent signal degradation of the OFFT 314 when there is no in-band interference so as to maximize the sensitivity of the GPS receiver 102.

But, if the detected interference is inside of the 2 MHz GPS bandwidth, the controller or processor 310 will select the OFFT 314. Note that in the present example embodiment, the OFFT 314 will only operate when the 2 MHz Digital Filter 312 is enabled. This is because the 2 MHz Digital Filter 312 also performs decimation of the output of the Carrier Mixer 308 from its higher sampling rate to the lower sampling rate of the OFFT 314. Alternatively, if there is no interference detected, both the 2 MHz Digital Filter 312 and the OFFT 314 may be bypassed altogether. This is because the 6 MHz bandwidth of the front-end IF filter 302 is preferred under no narrowband interference condition as it maximizes receiver sensitivity and multipath resolution capability. In the current implementation, the digital filter 312 used in combination with the OFFT 314 is employed to reduce the sampling rate at which the OFFT 314 has to operate. In other implementations, an OFFT may operate on its own.

Figure 5:
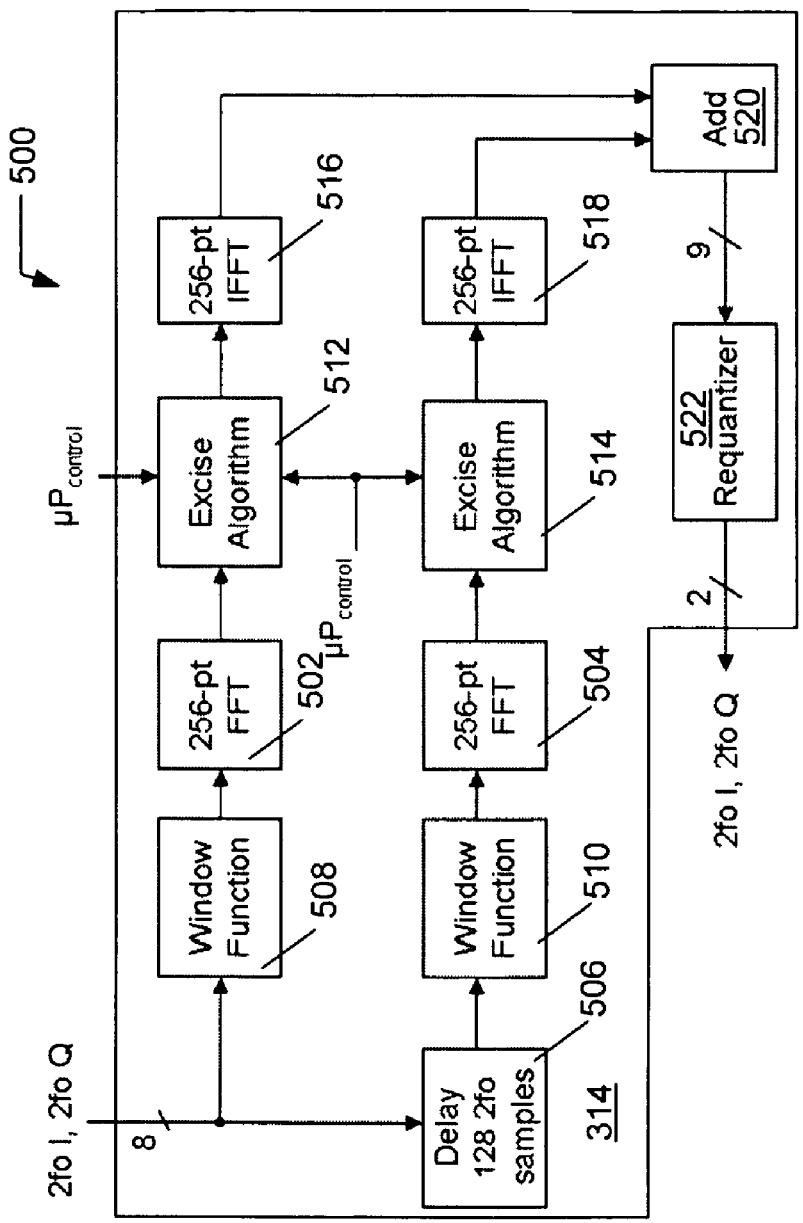
FIG. 5 is a block diagram of an example of an implementation of the OFFT of FIG. 3 in accordance with the invention.

FIG. 5 is a block diagram 500 that illustrates an embodiment of the OFFT 314 shown in FIG. 3 designed to provide GPS receiver 102 with the capability to mitigate narrowband interference signals within the GPS signal bandwidth. The inputs to the OFFT 314 are the complex outputs of the 2 MHz Digital Filter 312, FIG. 2. The OFFT 314, FIG. 5, may use two weighted 256-point FFTs 502 and 504 operating in parallel with the input samples to the second FFT 504 offset by 128 samples by the delay module 506, or half of the FFT window, from the first FFT. The weighting introduced by the Window Functions 508 and 510 is designed to limit the inherent frequency spreading of the narrowband interference caused by the finite duration of the FFTs. However, the weighting also introduces a loss. The second FFT 504 with 50% overlap helps to reduce the weighting loss. The outputs of the FFT 502 and 504 represent power in the frequency domain.

For a 256-point FFT, the frequency resolution of each bin is the input sampling rate divided by 256. Interference mitigation may be accomplished by excising those frequency bins whose magnitude exceeds a threshold in the Excise Algorithms 512 and 514. It is noted in the current implementation that the OFFT is essentially dumb with respect to frequency bin nulling, i.e., it does not make its own decisions. The decisions as to which frequency bins to null are made by the processor or controller based on the frequency/power of the interferers' interference observed by the CW scanner.

This threshold may be set proportional to the noise channel power read from the Frequency Scanner 306. Alternatively, the decision regarding which frequency bins to excise with the Excise Algorithms 512 and 514 may also be made by the controller or processor 310. The CW scanner may also have the capability to except only one interferer from a given frequency scan range; this prevents a single large interferer and its sidelobes from dominating all top eight interferers' interference found during a frequency scan.

In all cases, the same frequency bins are excised in both signal paths. The outputs of the Excise Algorithms 512 and 514 are passed to the 256-point IFFT 516 and 518, respectively, where the frequency domain samples are transformed back into the time domain. The two signal paths from the IFFT are added by adder 520 and re-quantized by requantizer 522. In one embodiment, the design allows up to 8 frequency sets to be excised with each frequency set consisting of 2 or 3 frequency bins on either side of the center frequency. This is because the Window Functions 508 and 510 cause the narrowband interference to occupy approximately seven frequency bins (less for CW of less power). The number of bins is related to the observed interferer power because more interferer power causes larger sidelobe power out of the FFT operation. In other implementations, other frequency bin excising may be employed. For example, frequency bin excising of 3 and 5 bins may be employed.

To improve GPS receiver sensitivity down to −160 dbm where relatively low level narrowband interference can easily jam GPS reception, the Frequency Scanner 306 has to accumulate the baseband samples from the mixer for a long duration. Longer integration time also means narrower frequency bins and a proportionate increase in the number of frequency bins required to cover a given frequency range. Therefore the total scan time increases as a square of the increase in integration time. To reduce the scan time multiple accumulators along with running the Carrier NCO+LUT 404, FIG. 4, and mixer 404 at a faster frequency can be used.

Because the Frequency Scanner 306, FIG. 3, is separate from the OFFT, interference detection and monitoring operate independently of interference mitigation. This decoupling allows the OFFT 314, FIG. 5, to operate at a shorter integration interval than the Frequency Scanner for faster interference mitigation response time. Shorter integration intervals also mean the FFT/IFFT 508, 510, 516 and 518 of the OFFT 314 may be made as small as 256 points, thus reducing the complexity of the design.

Figure 6:
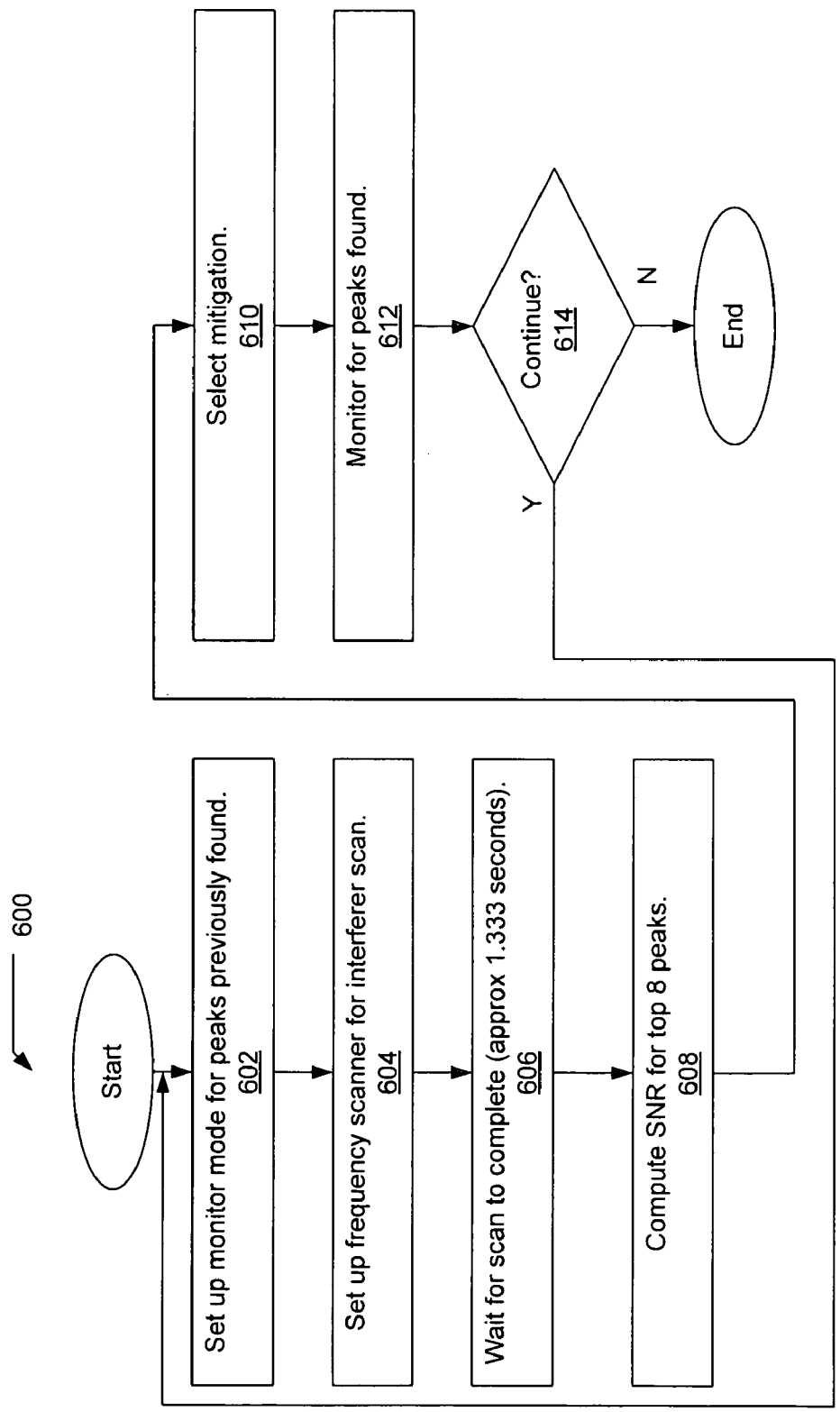
FIG. 6 is a flow diagram of an example implementation of a process for mitigating the effects of narrowband interference in the GPS receiver of FIG. 2.

FIG. 6 is a flow diagram 600 of an example implementation of a process for mitigating the effects of narrowband interference in the GPS receiver of FIG. 2. The flow diagram starts by setting up monitoring for peaks previously found 602. The frequency scanner is configured for operation as an interferer scanner 604 and an interferer scan is commenced. The scan may take approximately 1.333 seconds to complete and the process may wait for the scan to complete. The results of the interferer scan is that a number of peaks will be identified. The signal to noise ratio (SNR) is determined for the top eight peaks 608 in the current implementation. Once the SNR is computed, it may be used to select the mitigation method or approach 610. Examples of the mitigation approaches may include no mitigation, 2 MHz digital filter mode, and OFFT mode.

A 2 versus 4-bit A/D decision may also be included as a mitigation approach that may be selected. The 2-bit A/D decision is suitable for a large interferer; essentially the non-linearity of the 2-bit A/D creates a large number of smaller interferers (hence multiplying the problem). This problem is mitigated when using a 4-bit A/D as the signal path remains linear for a higher interferer power.

The peaks that are found are monitored 612. The process may continue 614 and monitoring may be configured for monitoring peaks previously found 608 (the top 8 peaks in the current implementation). Otherwise if the process is not going to continue 614, then it is shown ending. In actual process, other procedures or functions could be called and other types of processing would occur within the GPS receiver.

Furthermore, the multiple process steps implemented with a programming language, which comprises an ordered listing of executable instructions for implementing logical functions, can be embodied in any machine-readable media for use by or in connection with an instruction execution system, apparatus, or device, such as a computer-based system, controller-containing system having a processor or controller, such as a microprocessor, digital signal processor, discrete logic circuit functioning as a controller, or other system that can fetch the instructions from the instruction execution system, apparatus, or device and execute the instructions.

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A method for pre-correlation detection and mitigation of narrowband interference in a GPS receiver comprising:
    receiving positioning signals in a predetermined band within an intermediate frequency band at the GPS receiver, the predetermined band being less than the intermediate frequency band;
    detecting narrowband interference interfering with the positioning signals;
    selecting in real time between at least a first interference mitigation technique if the narrowband interference is detected at a frequency outside the predetermined band and a second interference mitigation technique if the narrowband interference is detected at a frequency inside the predetermined band; and
    initiating the selected interference mitigation technique to mitigate the narrowband interference, wherein the first interference mitigation technique and the second interference mitigation technique reduce the narrowband interference.

2. The method of claim 1, where the second interference mitigation technique includes selecting an excision of interference in the frequency domain using an OFFT (Overlapped Fast Fourier Transform).

3. The method of claim 1, where the first interference mitigation technique includes filtering in the time domain to mitigate interference outside of a predetermined signal bandwidth.

4. The method of claim 1, where the second interference mitigation technique includes the use of an OFFT (Overlapped Fast Fourier Transform) for an excision of interference in the frequency domain and a filter for suppression of interference in the time domain.

5. The method of claim 1, where the detecting narrowband interference occurs by scanning with a frequency scanner that operates independently of the interference mitigation technique.

6. The method of claim 5, where the scanning further includes scanning across a frequency range encompassing both the positioning signals' bandwidth and a frequency range outside of the positioning signals' bandwidth up to the intermediate frequency band.

7. The method of claim 6, where the scanning further includes a plurality of frequency bins, where a frequency bin width and the number of frequency bins in the plurality of frequency bins to scan are controlled by a processor as a function of desired sensitivity of interference detection and the intermediate frequency band to be searched.

8. The method of claim 6, where the scanning further includes:
    calculating the interference power in each frequency bin in the plurality of frequency bins;

generating a quadrature sinusoidal of the desired frequency using a Carrier NCO+LUT (Carrier Numerically Controlled Oscillator and Look Up Table);

mixing the generated quadrature sinusoidal against received input data to generate a baseband signal;

accumulating the baseband signal for a number of samples as determined by a required interference detection sensitivity; and calculating a magnitude of the accumulated baseband signal.

9. The method of claim 8, further including the step of accumulating a magnitude for all the frequency bins to compute a noise channel power.

10. The method of claim 9, further including the step of generating an interference detection threshold with the noise channel power.

11. The method of claim 8, further including the step of searching a magnitude for all the frequency bins to find the top N frequency bins with the highest power, where N is a positive number.

12. The method of claim 11, further including the step of sorting all the frequency bins.

13. The method of claim 11, where the magnitudes for all the frequency bins are compared against a interference detection threshold derived from a noise channel power to detect the presence of narrowband interference in any of the top N frequency bins.

14. The method of claim 5, further including the step of monitoring the detected narrowband interference with the frequency scanner.

15. The method of claim 14, further including the step of determining if the detected narrowband interference is outside of a 2 MHz GPS bandwidth and selecting a 2 MHz Digital Filter to mitigate the detected narrowband interference.

16. The method of claim 14, where the intermediate frequency band is 6 MHz, and the predetermined band is 2 MHz, further including the step of determining if the detected narrowband interference is inside of the 2 MHz GPS bandwidth and selecting an overlapped Fast Fourier Transform (OFFT) along with a 2 MHz Digital Filter to mitigate the interference.

17. The method of claim 2, further including the step of employing the OFFT with a first weighted FFT and a second weighted FFT that operate in parallel in a first signal path and a second signal path respectively, where the input samples to the second FFT are offset half of a FFT window, from the first FFT.

18. The method of claim 17, further including the step of excising those frequency bins having a magnitude that exceeds a derived magnitude.

19. The method of claim 18, further including the step of determining which frequency bins are to be excised, where the determination is controlled by a processor and the same frequency bins are excised in the first and the second signal paths.

20. The method of claim 18, further including the step of transforming outputs of the excised frequency bins by an inverse Fast Fourier Transform (IFFT), where the frequency domain samples are transformed back into the time domain.

21. The method of claim 20, further including the step of adding the first and the second signal paths from the IFFT.

* * * * *